United States Patent [19]

O'Mahony

[11] Patent Number: 5,986,703
[45] Date of Patent: Nov. 16, 1999

[54] METHOD AND APPARATUS TO COMPENSATE FOR CAMERA OFFSET

[75] Inventor: Barry A. O'Mahony, Banks, Oreg.

[73] Assignee: Intel Corporation, Santa Clara, Calif.

[21] Appl. No.: 08/777,545

[22] Filed: Dec. 30, 1996

[51] Int. Cl.[6] .................................................. H04N 5/222
[52] U.S. Cl. .............................. 348/333; 348/211; 348/13
[58] Field of Search ..................................... 348/207, 211, 348/222, 333, 335, 15, 16, 17, 18, 19, 20, 36, 39, 143, 13, 14, 568, 578, 580, 581, 613, 704; H04N 5/225

[56] References Cited

U.S. PATENT DOCUMENTS

| | | | |
|---|---|---|---|
| 5,768,846 | 7/1998 | Hiroaki | 348/20 |
| 5,815,197 | 9/1998 | Kakii | 348/20 |

Primary Examiner—Tuan Ho
Attorney, Agent, or Firm—Blakely, Sokoloff, Taylor & Zafman LLP

[57] ABSTRACT

An image processing system adjusts a video signal representing a captured image of an object to compensate for an offset camera. The camera generating the video signal is offset from the object of the captured image. The system determines an offset measure between the camera and the object of the captured image. Based on the offset measure, the image processing system adjusts the video signal generated by the camera. The offset measure is determined by calculating the angular difference between a focal plane associated with the camera and an image plane associated with the object of the captured image. The video signal is adjusted by compressing portions of the video signal associated with the regions of the object located closest to the camera and expanding portions of the video signal associated with the regions of the object located farthest from the camera.

13 Claims, 10 Drawing Sheets

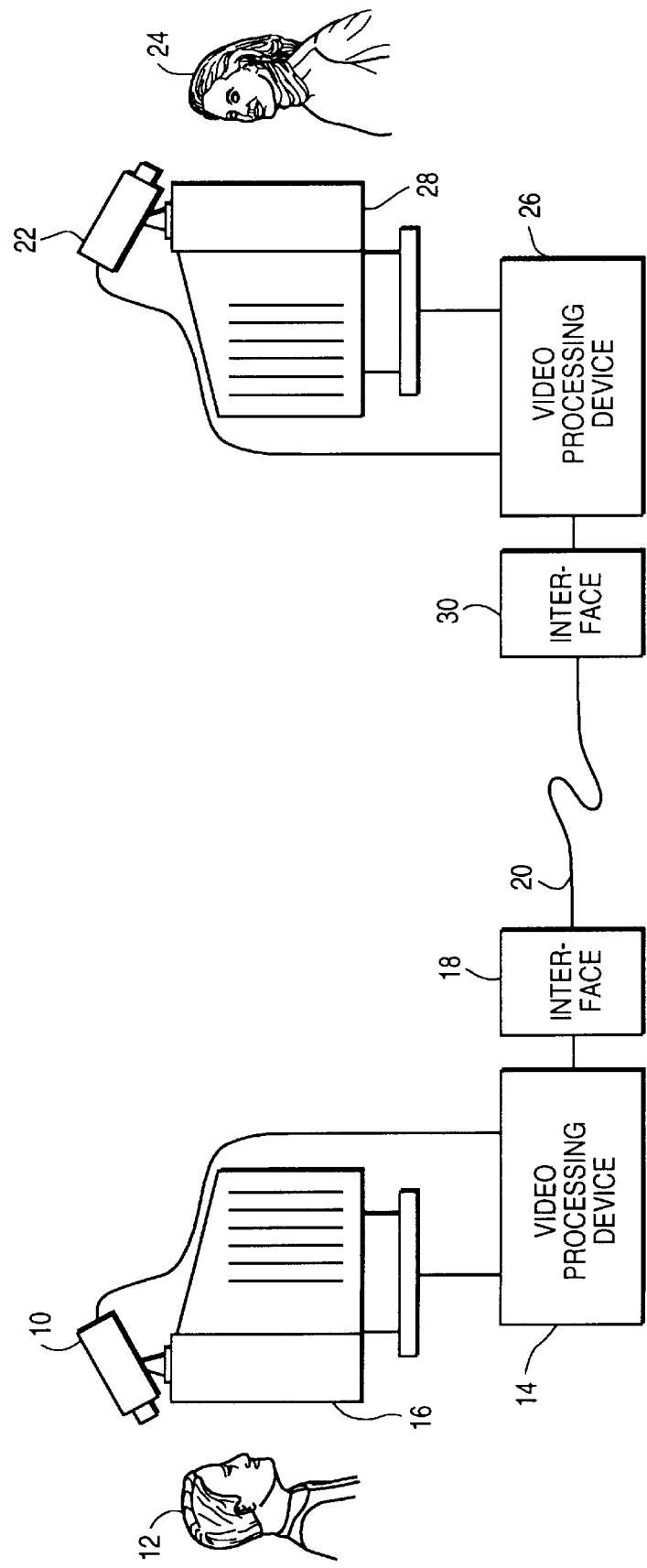

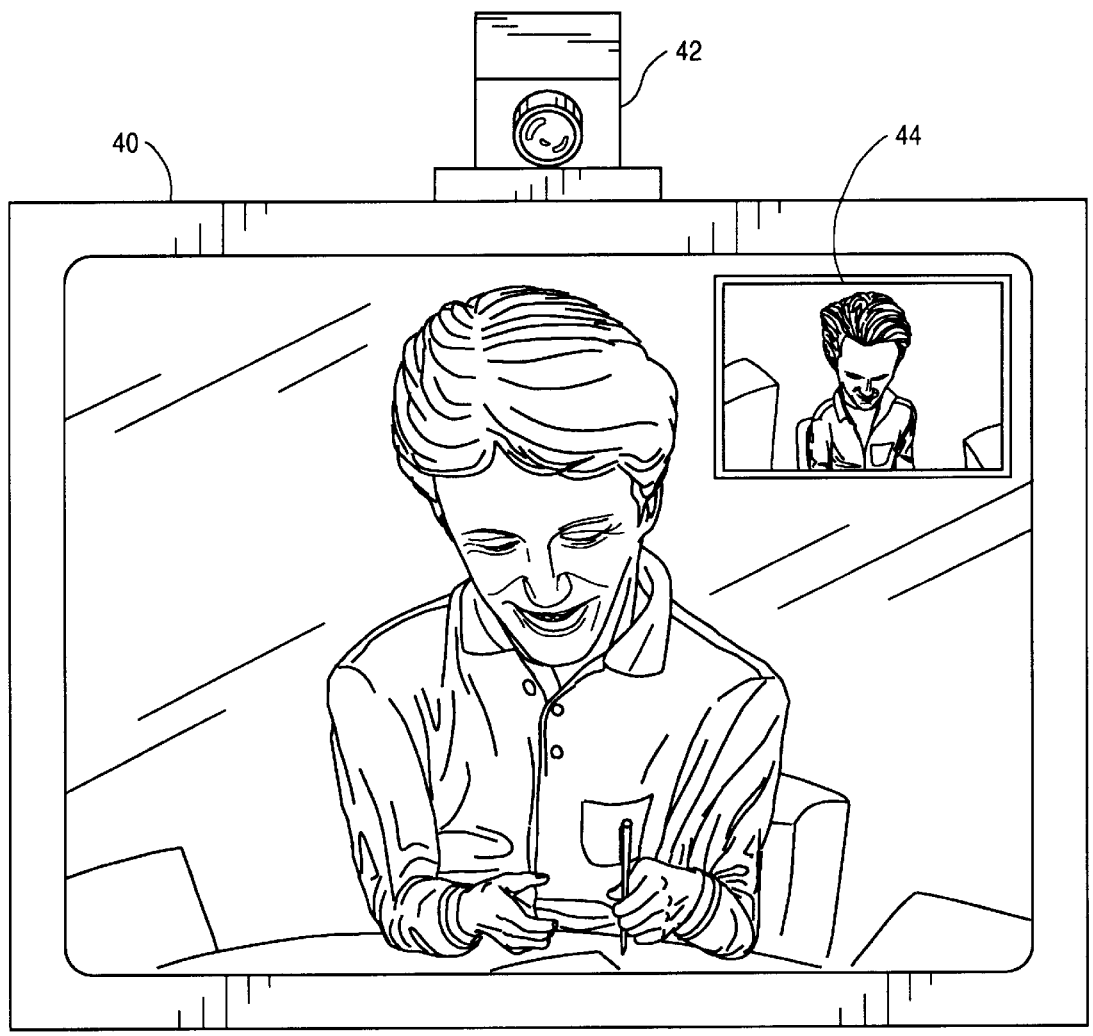
FIG_2

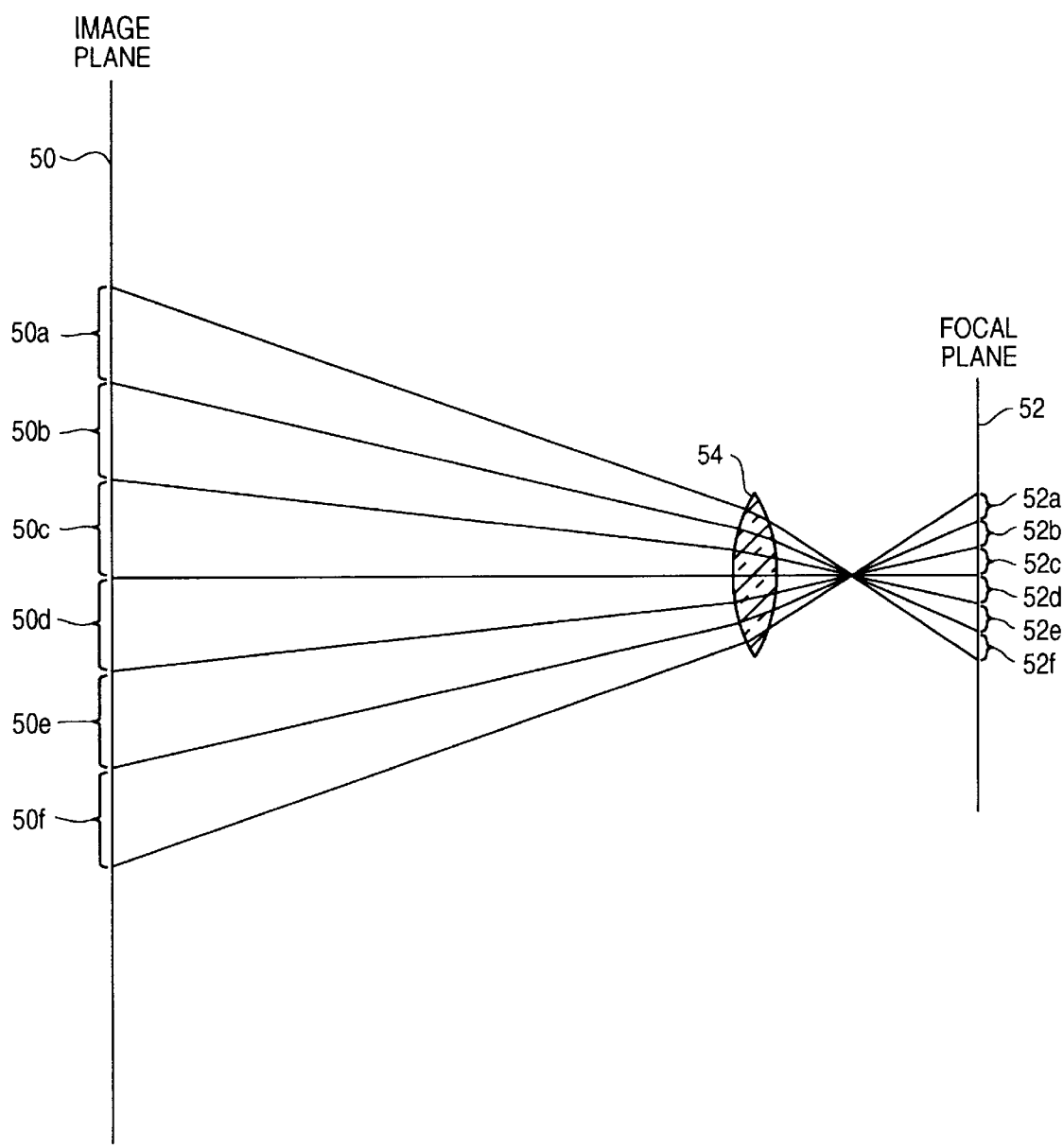
FIG_3

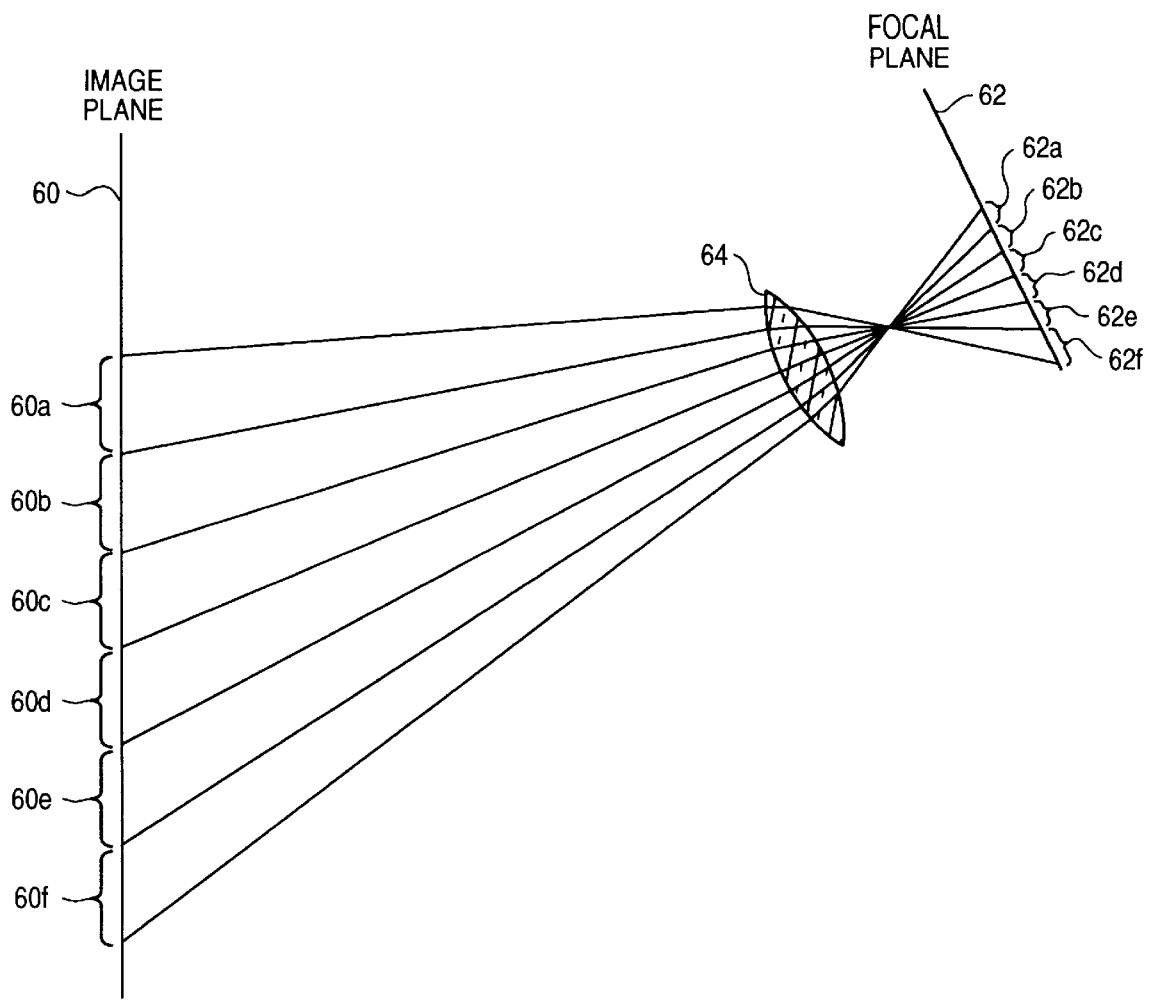
FIG_4

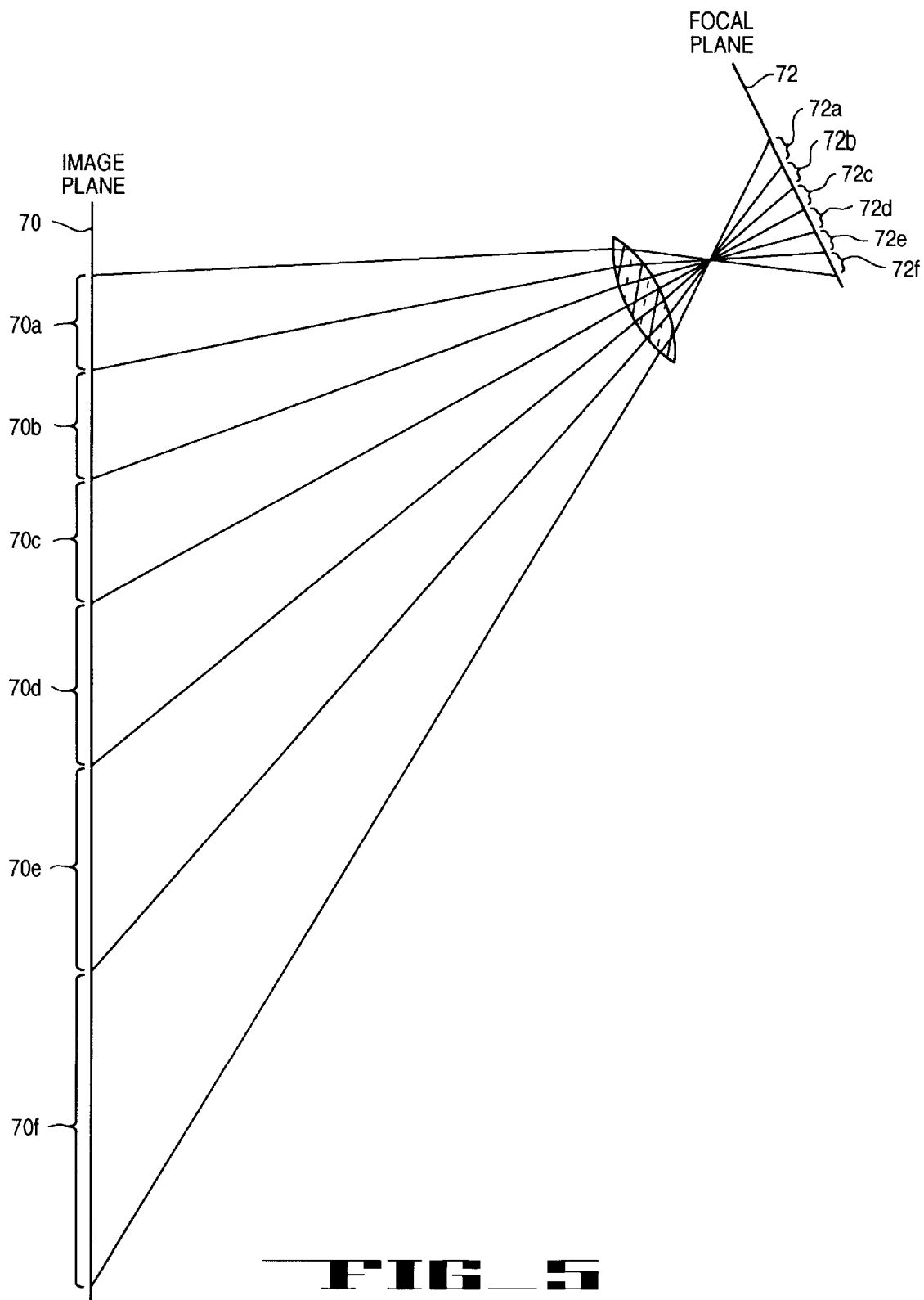
FIG_5

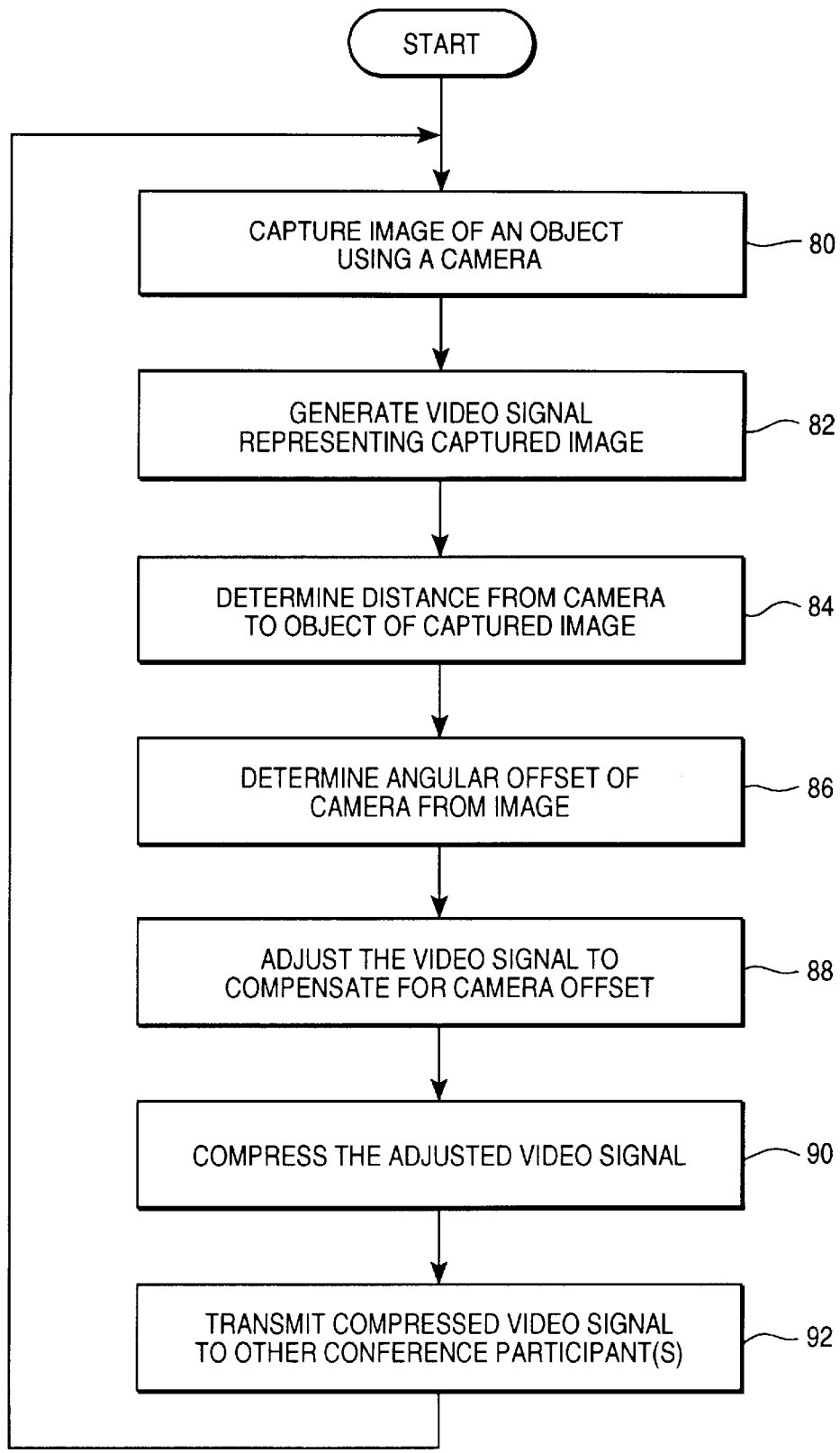
FIG_6

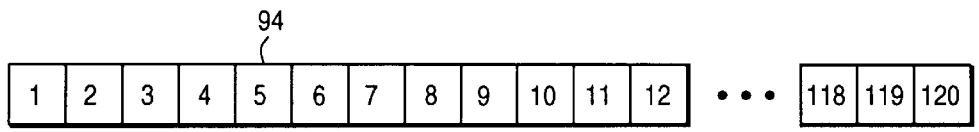
FIG_7
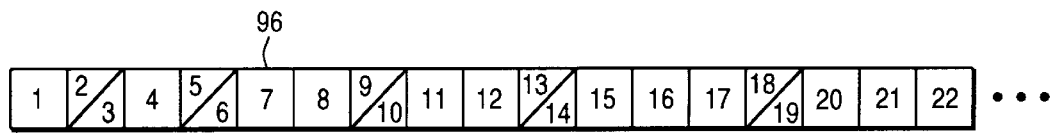
FIG_8A
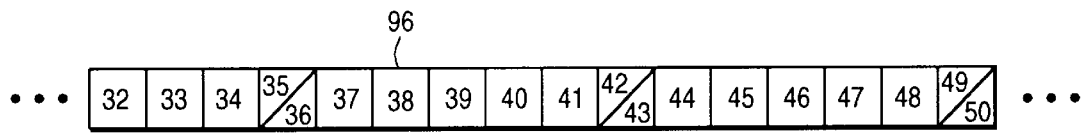
FIG_8B
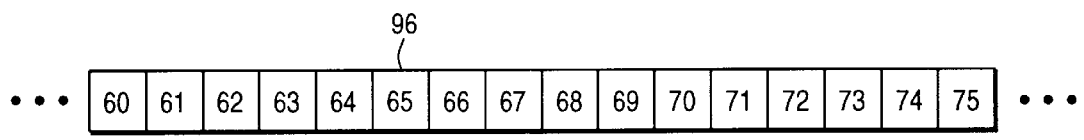
FIG_8C
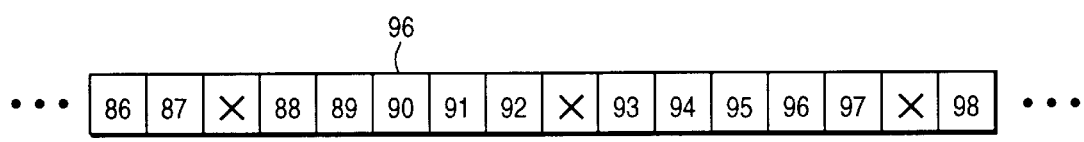
FIG_8D
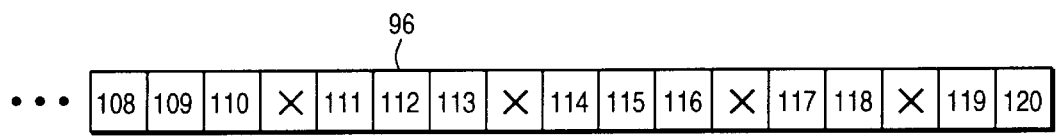
FIG_8E

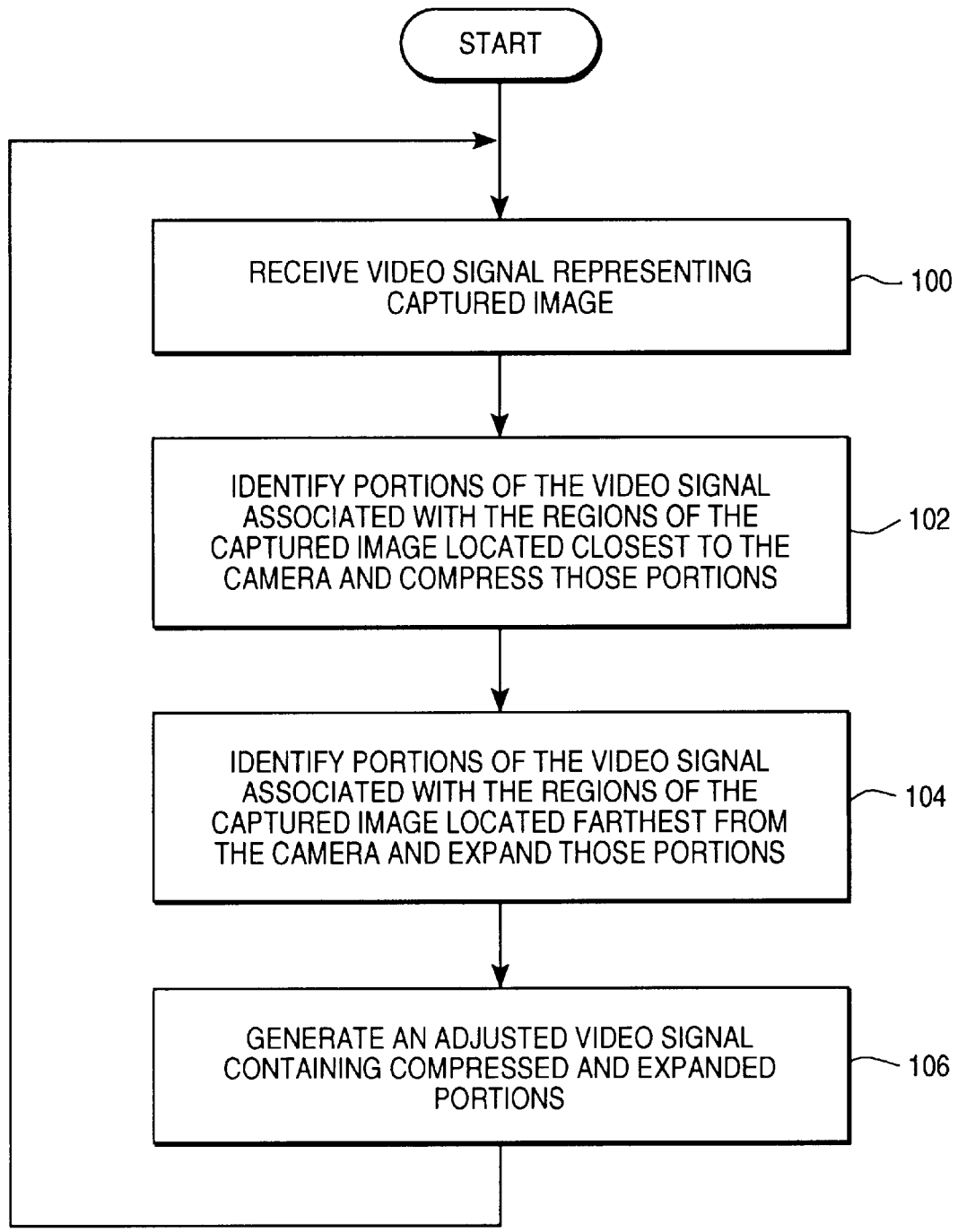

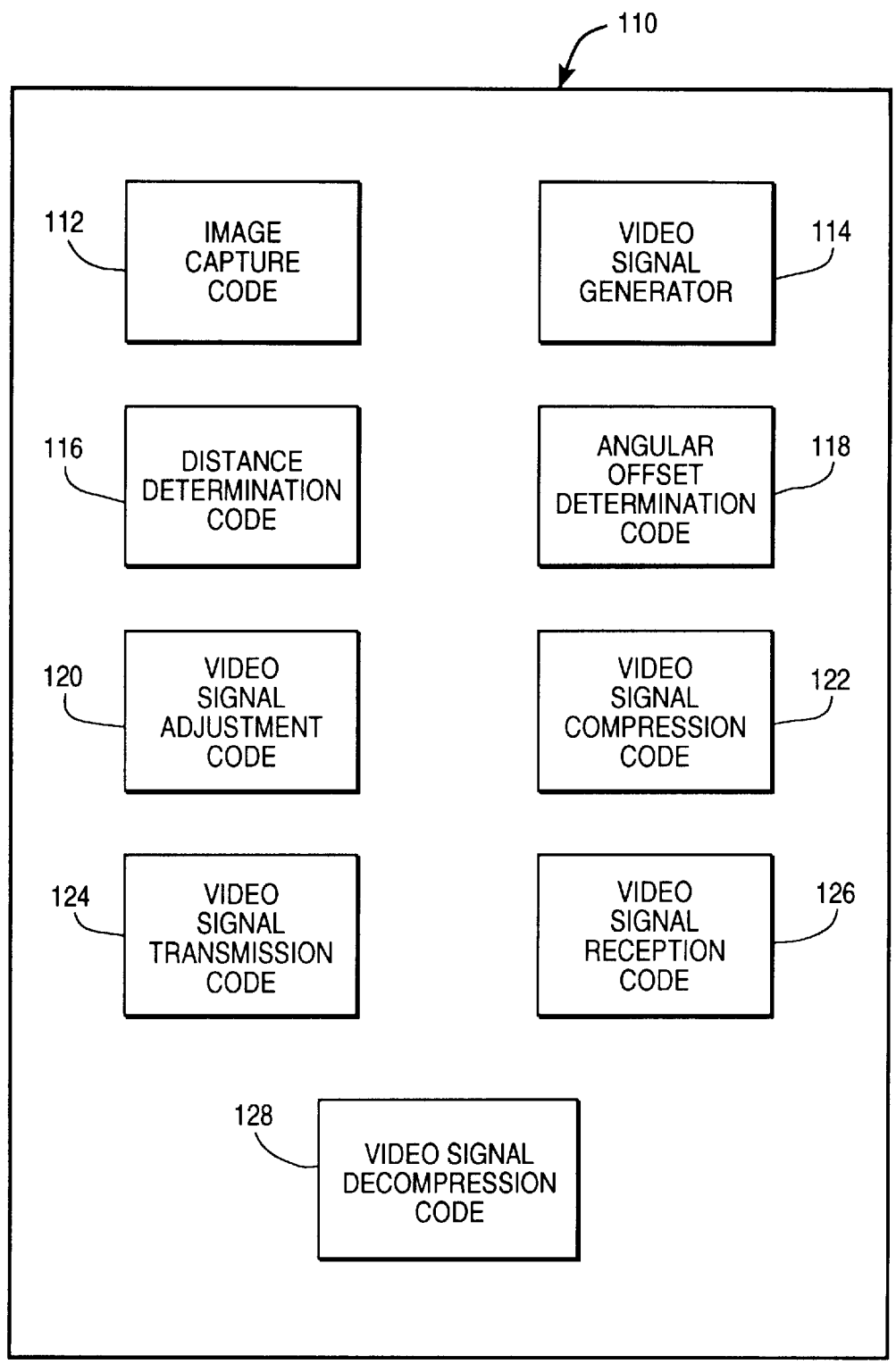
FIG_10

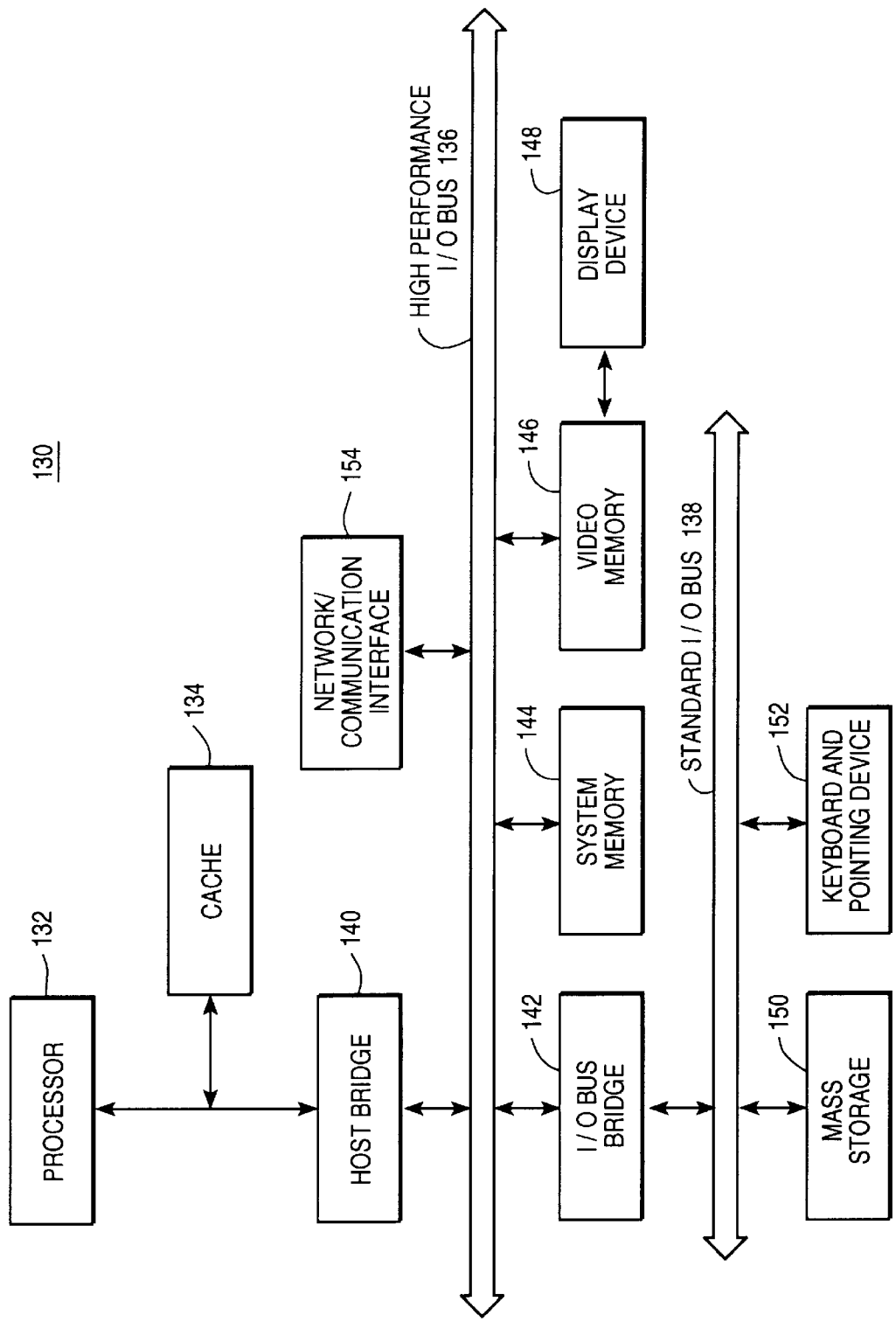
FIG._11

METHOD AND APPARATUS TO COMPENSATE FOR CAMERA OFFSET

BACKGROUND OF THE INVENTION

1. Field of the Invention

The present invention relates to an image processing system. More specifically, the present invention provides a system for adjusting a video signal to compensate for a camera that is offset from an object of a captured image.

2. Background

Various types of image processing systems, such as video conferencing systems, utilize a camera coupled to a computer or other image processing system to capture an image of an object, such as the person or persons participating in the video conference. The image processing system is capable of storing, displaying, or transmitting the captured image. For example, in a video conferencing system, the image processing system transmits the captured image to a similar image processing system at the opposite end of a video conference link.

Personal video conferencing systems may be utilized when a single participant is located at each end of the video conference link. Personal video conferencing systems typically utilize a camera mounted to a computer monitor. The camera may be mounted on top of the computer monitor or on either side of the monitor. Generally, the conference participant sits in front of the monitor, which displays an image of the other conference participant. In a personal video conferencing system, the conference participants are typically located close to the computer monitor and close to the camera. Since the camera is not located directly in front of the conference participant, the camera is typically aimed toward the participant.

For example, if the camera is mounted on top of the computer monitor, the camera is aimed down toward the face of the conference participant. Similarly, if the camera is mounted on the side of the computer monitor, then the camera is aimed inward toward the conference participant. Since the aiming axis of the camera is offset from the natural, face-to-face viewing angle, the image of the conference participant is distorted. The offset camera causes expansion of the portions of the captured image closest to the camera (e.g., the conference participant's forehead). The offset camera also causes compression of portions of the captured image farthest from the camera (e.g., the participant's mouth and chin).

The distortion of the conference participant produces an unnatural image that is transmitted to the other conference participant. The unnatural image reduces the overall quality and realism of the conferencing system.

Therefore, it is desirable to provide a system that compensates for an offset camera in a video conferencing system.

SUMMARY OF THE INVENTION

The present invention provides a system that adjusts a video signal to compensate for an offset camera. An embodiment of the present invention provides a system that determines an offset measure between the camera and an object of an image being captured by the camera. The system then adjusts the video signal generated by the camera in accordance with the determined offset measure.

An embodiment of the invention determines the offset measure by determining the angular difference between a focal plane associated with the camera and an image plane associated with the object of the captured image.

Other embodiments of the invention compress portions of the video signal associated with the regions of the object located closest to the camera.

Further embodiments of the invention expand portions of the video signal associated with the regions of the object located farthest from the camera.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 1 illustrates a block diagram of an embodiment of a video conferencing system capable of utilizing the teachings of the present invention.

FIG. 2 illustrates an embodiment of a camera and a monitor used in the video conferencing system of FIG. 1.

FIG. 3 illustrates the capturing of an image by a camera when the image plane and the camera focal plane are parallel to one another.

FIGS. 4 and 5 illustrate the capturing of an image by a camera when the image plane and the camera focal plane are not parallel to one another.

FIG. 6 is a flow diagram illustrating an embodiment of a procedure for adjusting a video signal to compensate for a camera offset.

FIG. 7 illustrates an example video data stream representing a captured image.

FIGS. 8A–8E illustrate an example video data stream that has been adjusted to compensate for a camera offset.

FIG. 9 is a flow diagram illustrating an embodiment of a procedure for expanding and compressing portions of a video signal representing a captured image of an object.

FIG. 10 illustrates an embodiment of a processor-readable medium containing various information used by a computer or other processing device.

FIG. 11 illustrates an embodiment of a hardware system suitable for use with the present invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, components, algorithms, protocols, and circuits have not been described in detail so as not to obscure the invention.

The present invention relates to an image processing system that provides a mechanism for adjusting or modifying a video signal to compensate for an offset camera. In the discussion that follows, a particular application of the invention will be described with respect to a video conferencing system. However, those skilled in the art will appreciate that the systems utilized to compensate for a camera offset can be used in any application in which an image is captured by an offset camera or similar device.

An offset camera produces a distorted image because the camera is not directly in front of the conference participant. However, the video signal is adjusted by the image processing system to compensate for the offset camera, such that the image appears to be face-to-face (i.e., a normal conversational view). After adjusting the video signal, the conference participant's face and other features appear in natural proportion to one another. Thus, the conferencing system improves the overall quality and realism of a video conference.

FIG. 1 illustrates a block diagram of an embodiment of a video conferencing system capable of utilizing the teachings of the present invention. A camera 10 is provided to capture an image of object 12 and provide a video signal representing the captured image to a video processing device 14. A display device 16 is also coupled to video processing device 14 for displaying the captured image as well as the image of the other conference participants. An interface 18 is coupled to video processing device 14 and to a communication medium 20.

Another camera 22 is used to capture an image of object 24 at the opposite end of the video conference link. Camera 22 generates a signal representative of the captured image and provides the signal to a video processing device 26. A display device 28 is coupled to video processing device 26 and displays the images captured by cameras 10 and 22. An interface 30 is coupled between video processing device 26 and communication medium 20.

In the video conferencing system of FIG. 1, camera 10 captures an image of object 12, which is processed by video processing device 14 and transmitted across communication medium 20 to the other conference participant for display on that participant's display device 28. Similarly, camera 22 captures an image of object 24, which is processed by video processing device 26 and transmitted across communication medium 20 for display on display device 16.

Video processing devices 14 and 26 perform various operations on the video signals received from cameras 16 and 28, as well as signals received from interfaces 18 and 30. For example, if camera 10 generates an analog data signal, then video processing device 14 converts the analog data signal generated to a digital data signal. Additionally, video processing device 14 compresses the video data signal received from the camera before transmitting the data across communication medium 20. Video data compression reduces the transmission time or bandwidth requirements for transmitting the data across communication medium 20. Similarly, video capture device 14 decompresses the signals received from video processing device 26 before transmitting the video signal to display device 16. Video processing device 26 performs similar operations on data received from camera 22 and communication medium 20.

In one embodiment of the invention, video processing devices 14 and 26 are image processing boards located in a computer system such as a general purpose computer. Alternatively, video processing devices 14 and 26 can be specialized video conferencing devices designed specifically for video conferencing applications. In specific embodiments of the invention, certain functions performed by video processing devices 14 and 26 are incorporated within cameras 10 and 22. For example, the camera may include an analog-to-digital converter such that the camera generates a digital output signal. In this situation, it is not necessary for the video processing device to perform an analog-to-digital conversion on the video signal generated by the camera.

Interfaces 18 and 30, used to communicate data across communication medium 20, can utilize various transmission or interface protocols. Similarly, various types of display devices 16 and 28 can be used to display the video conferencing images.

FIG. 2 illustrates an embodiment of a camera 42 and a monitor (or display device) 40 used in a video conferencing system, such as the system shown in FIG. 1. Monitor 40 displays an image of the conference participant at the opposite end of the video conference link. Camera 42 is mounted on top of monitor 40 and captures the image of the local conference participant for transmission to the opposite end of the video conference link. A window 44 is provided in the display of monitor 40 and illustrates the image being transmitted to the other conference participant (i.e., the image captured by camera 42). This display is useful for aiming camera 42 such that the other conference participant receives a proper image (i.e., a centered image). A similar arrangement of a monitor and a camera is provided at the opposite end of the video conference link.

Camera 42 is pointed downward toward the face of the local conference participant, thereby causing distortion in the image captured by the camera. As discussed above, the camera offset distorts the image of the conference participant by expanding or extending the object features closest to the camera and compressing the object features farther from the camera. For example, a conference participant's forehead may be expanded since it is located close to the camera. However, a participant's distant features, such as the mouth and chin, are compressed due to their increased distance from the camera. As discussed below, the teachings of the present invention adjust the video signal to compensate for this expansion and compression of the captured image.

FIG. 3 illustrates the capturing of an image by a camera when the image plane and the camera focal plane are parallel to one another. This illustrates the situation when the camera is directly in front of the object being captured. The image plane for a video conferencing system typically represents the plane of the user's face. The camera focal plane (i.e., the surface on which the image is projected within the camera) is perpendicular to the aiming axis of the camera.

Referring to FIG. 3, image plane 50 and camera focal plane 52 are parallel to one another. Therefore, as the captured image passes through a camera lens 54 and is projected onto focal plane 52, the image is not distorted by compressing or expanding the image features. Although the image is inverted when projected onto focal plane 52, compression or extension of the image does not occur. For example, if the object in image plane 50 is divided into uniform portions, the associated image portions in focal plane 52 are also uniform. Thus, image portion 50a in image plane 50 corresponds to image portion 52f in focal plane 52. Similarly, image portion 50b in image plane 50 corresponds to image portion 52e in focal plane 52. Thus, as the image portions 50a–50f pass through lens 54, the size of the associated image portions 52a–52f in focal plane 52 are uniform. Since image plane 50 and focal plane 52 are parallel, the problems associated with an offset camera are not encountered.

FIG. 4 illustrates the capturing of an image by a camera when an image plane 60 and a camera focal plane 62 are not parallel to one another (e.g., when the camera is offset from the object of the image). Since image plane 60 is not parallel with focal plane 62, compression and expansion of the image occurs when the image is projected onto focal plane 62. For purposes of illustration, image portions 60a–60f along image plane 60 are selected to have uniform size. However, as these image portions pass through lens 64 and are projected onto focal plane 62, the lengths of the associated image portions are not uniform. For example, image portion 60a in image plane 60 is associated with image portion 62f in focal plane 62. Similarly, image portion 60f in image plane 60 is associated with image portion 62a in focal plane 62. Although image portions 60a and 60f have the same size, the associated image portions in the focal plane have significantly different sizes, as illustrated by the differences between segments 62*a* and 62*f*.

FIG. 5 illustrates another representation of the capturing of an image by a camera where an image plane 70 and a camera focal plane 72 are not parallel to one another. In this example, the image portions in focal plane 72 are of uniform size. This type of image sampling (uniform sample sizes) is representative of the operation of a typical camera. However, as FIG. 5 illustrates, the actual size of the image region in image plane 70 associated with the sampled image portion in focal plane 72 varies significantly. For example, sampled image portion 72*f* is associated with a relatively small image portion 70*a* of image plane 70. However, sampled image portion 72*a* is associated with a much larger image portion 70*f* in image plane 70. Therefore, although the sampled image portions 72*a*–72*f* are uniform in size, they do not represent uniform portions of the image in image plane 70.

As a result of the non-uniform image portions in image plane 70, the close features of the image (e.g., regions 70*a* and 70*b*) are expanded or extended due to the camera offset. Similarly, the regions of the image farthest from the camera (e.g., image portions 70*e* and 70*f*) are compressed by the camera offset. Therefore, it is necessary to adjust the size of the image portions in focal plane 72 to compensate for the camera offset. This compensation is performed by compressing areas of the image that have been expanded and expanding areas of the image that have been compressed, thereby producing a relatively uniform and naturally-appearing image.

FIG. 6 is a flow diagram illustrating an embodiment of a procedure for adjusting a video signal to compensate for a camera offset. At step 80 an image of an object is captured using a camera or similar video capture device. Step 82 generates a video signal representative of the image captured in step 80. Steps 84 and 86 collectively determine an offset measure between the camera and the object of the captured image. Specifically, step 84 determines the distance from the camera to the object of the captured image. This distance determination is typically performed as part of a camera's auto-focus system. Step 86 determines the angular offset of the camera from the object of the captured image. The angular offset includes the direction of the offset (e.g., above the conference participant or to the right of the participant). Angular offset may be determined by various settings or parameters which can be adjusted by the user of the video conferencing system. For example, a switch or setting may be provided indicating whether the camera is positioned on top of the monitor or on either side of the monitor. Additionally, a setting may be available to indicate the size of the monitor to which the camera is attached. With the above data, the system is capable of determining the angular offset of the camera from the image being captured.

Step 88 uses the distance from the camera to the image determined in step 84 and the angular offset determined in step 86 to adjust the video signal to compensate for the camera offset. Additional adjustments may be performed by the user to further modify the appearance of the captured image.

At step 90, the adjusted video signal is compressed by the image processing system, and at step 92 the compressed video signal is transmitted to other conference participants. The procedure then returns to step 80 to capture the next image. The procedure illustrated in FIG. 6 is executed on each end of the video conference link. Those of ordinary skill in the art will appreciate that various procedures may be utilized to determine an offset measure between the camera and the object of the captured image. Furthermore, multiple offset measures may be determined to properly compensate for different camera positions, camera angles, or object locations.

FIG. 7 illustrates an example video data stream 94 representing a captured image. In this particular example, data stream 94 has 120 data fields, or pixel entries. Data stream 94 may represent a single row of pixels or a single column of pixels in the captured image.

FIGS. 8A–8E illustrate an example video data stream 96 that has been adjusted to compensate for a camera offset. FIGS. 8A–8E collectively represent a single video data stream generated by the image processing system. FIG. 8A illustrates the first portion of data stream 96 with various pixel values combined together to compress the video signal. The data elements illustrated in FIG. 8A represent a portion of data steam 96 associated with the closest portions of the object. As discussed above, the closest portions of the object are expanded in the captured image. Therefore, this portion of the data stream is compressed to compensate for the expansion caused by the offset camera. The compressing of pixel data is illustrated by the combined data elements 2/3, 5/6, 9/10, 13/14, and 18/19. The notation "2/3" indicates that the value for that new (adjusted) pixel value is the average of the values previously associated with pixels 2 and 3.

FIG. 8B illustrates another portion of data stream 96, in which the amount of compression is reduced. The compression is reduced because this portion of the data stream is associated with portions of the object closer to the center of the object where the expansion caused by the camera offset is of a smaller magnitude.

FIG. 8C illustrates a section of data stream 96 near the center of the object, in which no compression is required.

FIG. 8D illustrates a section of data stream 96 between the center of the object and the distant portion of the object. In this section of data stream 96, interpolated data values are inserted between existing data values. For example, interpolated values are inserted between data elements 87 and 88, 92 and 93, and 97 and 98. The inserted (or interpolated) values, represented by "x", are used to expand the captured image in areas that were compressed due to the camera offset (e.g., areas farthest to the camera). The interpolated values may be determined by averaging the two adjacent data values.

FIG. 8E illustrates the portion of data stream 96 that is located farthest from the camera (i.e., where the image is compressed significantly). In this area, the interpolated values are inserted more frequently to compensate for the compression caused by the offset camera.

The compression and expansion techniques illustrated in FIGS. 7 and 8A–8E represent one possible procedure for adjusting the captured video signal. Those of ordinary skill in the art will appreciate that various other image compression and image expansion techniques may be utilized to adjust the video signal.

FIG. 9 is a flow diagram illustrating an embodiment of a procedure for expanding and compressing portions of a video signal representing a captured image. At step 100, the video signal representing the captured image is received from a camera or similar device. Step 102 identifies portions of the video signal associated with the regions of the captured image located closest to the camera. Step 102 also compresses those identified portions of the video signal.

Step 104 identifies portions of the video signal associated with the regions of the captured image located farthest from the camera and expands those portions of the video signal. Step 106 then generates an adjusted video signal that contains the compressed and expanded portions. This adjusted video signal generated at step 106 reduces the image distortion caused by the offset camera.

FIG. 10 illustrates an embodiment of a processor-readable medium 110 containing various information used by a computer or other processing device. The embodiment illustrated in FIG. 10 is suitable for use with the systems for adjusting a video signal discussed above. The information stored on medium 110 is used to perform various operations, such as the procedures described above with respect to FIGS. 6 and 9. Processor-readable medium 110 may also be referred to as a computer-readable medium. Processor-readable medium 110 may be any type of magnetic, optical, or electrical storage medium including a disk, diskette, CD-ROM, memory device, or similar storage medium.

Processor-readable medium 110 includes image capture code 112 for capturing an image and a video signal generator 114 for generating a video signal representative of the captured image. Distance determination code 116 calculates or identifies the distance between the camera and the captured image. Angular offset determination code 118 calculates or identifies the angular offset of the camera from the captured image. Video signal adjustment code 120 adjusts or modifies the video signal generated by generator 114 to compensate for the camera offset.

Processor-readable medium 110 also includes video signal compression code 122 that compresses video signals prior to transmission across a communication medium. Video signal transmission code 124 transmits the compressed video signal across a communication medium. Video signal reception code 126 receives video signals transmitted across a communication medium. Video signal decompression code decompresses a received video signal for display on a monitor or other display device.

Alternate embodiments of processor-readable medium 110 may include only a portion of the information shown in FIG. 10. Additionally, other code sequences, instructions, and other information may be generated during execution of the various procedures described herein. Those of ordinary skill in the art will appreciate that various code sequences, instructions, and procedures may be utilized by an end-system to implement the teachings of the present invention.

FIG. 11 illustrates an embodiment of a hardware system suitable for use with the present invention. In the illustrated embodiment, hardware system 130 includes processor 132 and cache memory 134 coupled together as shown. Additionally, hardware system 130 includes a high performance input/output (I/O) bus 136 and a standard I/O bus 138. A host bridge 140 couples processor 132 to high performance I/O bus 136, whereas an I/O bus bridge 142 couples the two buses 136 and 138 to each other. Coupled to bus 136 are network/communication interface 154, system memory 144, and video memory 146. A display device 148 is coupled to video memory 146. Coupled to bus 138 is mass storage 150 and keyboard and pointing device 152. These elements 132–152 perform their conventional functions known in the art. In particular, network/communication interface 154 is used to provide communication between system 130 and any of a wide range of conventional networks, such as an Ethernet network, token ring network, the Internet, etc. Various types of communication mediums may be coupled to network/communication interface 154 for transmitting and receiving information. It is to be appreciated that the circuitry of interface 154 is dependent on the type of network or communication system to which system 130 is coupled.

Mass storage 150 is used to provide permanent storage for the data and programming instructions to implement the above-described functions. System memory 144 is used to provide temporary storage for the data and programming instructions when executed by processor 132. Mass storage 150 may be provided with the programming instructions by loading the programming instructions from a distribution storage medium (not shown), or by downloading the programming distributions from a server (not shown). Collectively, these elements are intended to represent a broad category of hardware systems, including but not limited to, general purpose computer systems based on the Pentium® processor or Pentium® Pro processor, manufactured by Intel Corporation of Santa Clara, Calif.

It is to be appreciated that various components of hardware system 130 may be re-arranged. For example, cache 134 may be on-chip with processor 132. Furthermore, certain implementations of the present invention may not require nor include all of the above components. For example, mass storage 150, keyboard and pointing device 152, and/or display device 148 and video memory 146 may not be included in system 130. Additionally, the peripheral devices shown coupled to standard I/O bus 138 may be coupled to high performance I/O bus 136. In addition, in some implementations, only a single bus may exist with the components of hardware system 130 being coupled to the single bus. Furthermore, additional components may be included in system 130, such as a video capture device, additional processors, storage devices, or memories.

Although the present invention has been described with respect to a camera used in a video conferencing system, those skilled in the art will appreciate that these techniques may be utilized to adjust any type of video signal. Furthermore, these procedures may be utilized to adjust still images as well as moving images, such as the type captured in a video conferencing system.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method for adjusting a video signal representing a captured image of an object, the video signal being generated by a camera offset from the object of the captured image, the method comprising:

determining an offset measure between the camera and the object of the captured image; and adjusting the video signal generated by the camera in accordance with the determined offset measure to at least one of compress portions of the video signal associated with regions of the object located close to the camera, and expand portions of the video signal associated with regions of the object located far from the camera.

2. The method of claim 1 further including determining multiple offset measures between the camera and the object of the captured image.

3. The method of claim 1 wherein determining an offset measure between the camera and the object of the captured image comprises determining an angular difference between a focal plane associated with the camera and an image plane associated with the object of the captured image.

4. The method of claim 1 wherein determining an offset measure between the camera and the object of the captured image comprises determining a distance from the camera to the object of the captured image.

5. The method of claim 1 wherein determining an offset measure between the camera and the object of the captured image comprises:

determining a distance from the camera to the object of the captured image;

determining an angular offset between the camera and the object of the captured image; and determining an offset direction between the camera and the object of the captured image.

6. An image processing system comprising:

a camera configured to generate a video signal representing a captured image of an object, wherein the camera is offset from the object of the captured image; and a video processing device coupled to the camera and configured to adjust the video signal generated by the camera to compensate for the camera offset, said video processing device comprising at least one of an image expander to expand portions of the video signal associated with regions of the object located far from the camera, and an image compressor to compress portions of the video signal associated with regions of the object located close to the camera.

7. The image processing system of claim 6 further comprising a mass storage device to store the captured image.

8. The image processing system of claim 6 further comprising a communication interface configured to transmit the captured image across a communication medium.

9. An apparatus for adjusting a video signal representing a captured image of an object, the video signal generated by a camera offset from the object of the captured image, the apparatus comprising:

operating logic for determining an offset measure between the camera and the object of the captured image; and operating logic for adjusting the video signal generated by the camera in accordance with the determined offset measure, said operating logic for adjusting the video signal comprising at least one of operating logic for compressing portions of the video signal associated with regions of the object located close to the camera, and operating logic for expanding portions of the video signal associated with regions of the object located far from the camera.

10. The apparatus of claim 9 wherein the operating logic for determining an offset measure between the camera and the object of the captured image comprises operating logic for determining an angular difference between a focal plane associated with the camera and an image plane associated with the object of the captured image.

11. The apparatus of claim 9 wherein the operating logic for determining an offset measure between the camera and the object of the captured image comprises:

operating logic for determining a distance from the camera to the object of the captured image;

operating logic for determining an angular offset between the camera and the object of the captured image; and operating logic for determining an offset direction between the camera and the object of the captured image.

12. A computer software product including a medium readable by a processor, the medium having stored thereon:

a first sequence of instructions which, when executed by the processor, cause the processor to determine an offset measure between a camera and an object represented in a captured image; and a second sequence of instructions which, when executed by the processor, cause the processor to adjust a video signal generated by the camera in accordance with the determined offset measure, said second sequence of instructions comprising instructions which, when executed by the processor, cause the processor to at least one of compress portions of the video signal associated with regions of the object located close to the camera, and expand portions of the video signal associated with regions of the object located far from the camera.

13. The computer software product of claim 12 wherein the first sequence of instructions comprises instructions which, when executed by the processor, cause the processor to determine an angular difference between a focal plane associated with the camera and an image plane associated with the object of the captured image.

* * * * *